Figure 1:
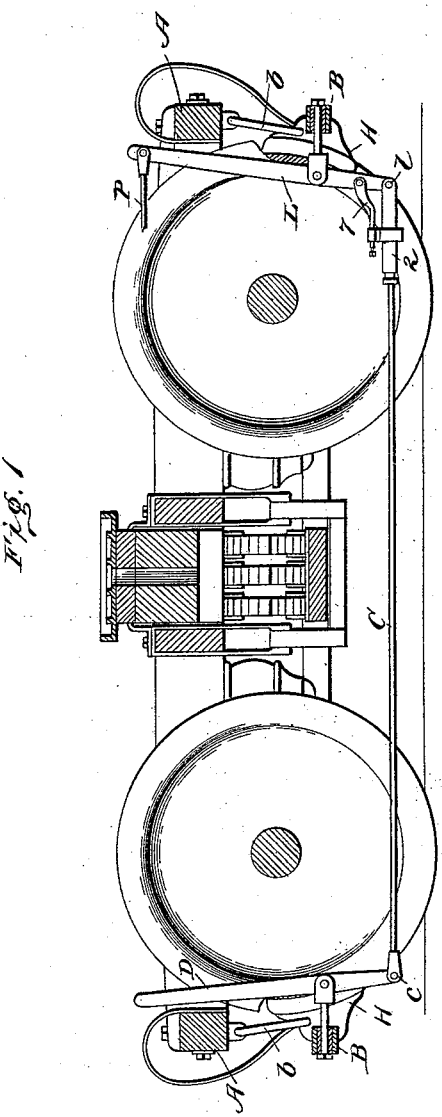

(No Model.) 2 Sheets—Sheet 1.

W. W. HOLMES.
SLACK ADJUSTER FOR CAR BRAKES.

No. 490,352. Patented Jan. 24, 1893.

Witnesses
Edwin L Bradford
Wm E Dye

Inventor
William W Holmes
by F. W. Ritter Jr
Attorney

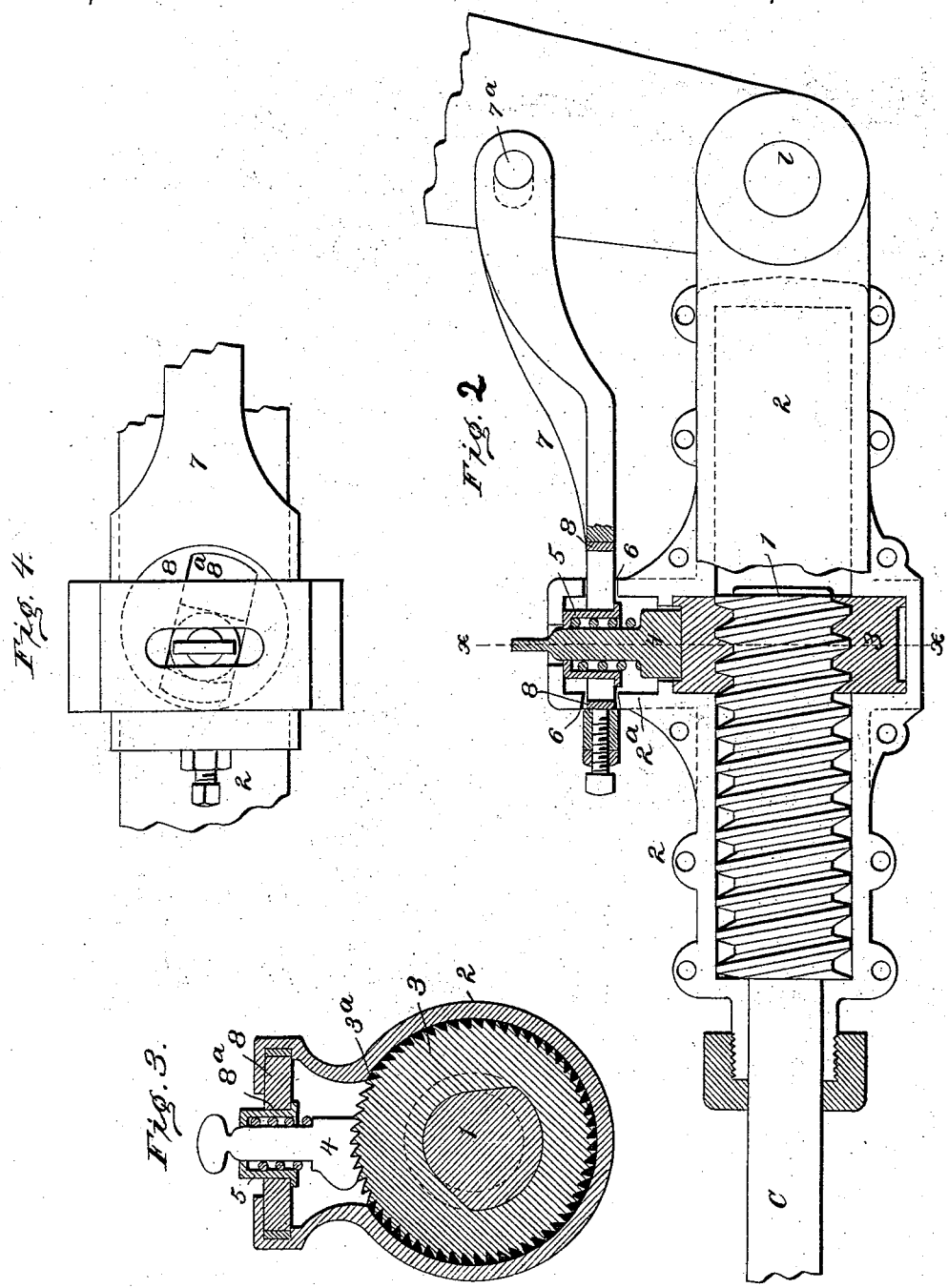

UNITED STATES PATENT OFFICE.

WILLIAM W. HOLMES, OF CHICAGO, ILLINOIS, ASSIGNOR TO THE CONSOLIDATED BRAKE ADJUSTER COMPANY, OF SAME PLACE.

SLACK-ADJUSTER FOR CAR-BRAKES.

SPECIFICATION forming part of Letters Patent No. 490,352, dated January 24, 1893.

Application filed November 11, 1892. Serial No. 451,686. (No model.)

*To all whom it may concern:*

Be it known that I, WILLIAM W. HOLMES, a citizen of the United States, residing at Chicago, in the county of Cook, State of Illinois, have invented certain new and useful Improvements in Slack-Adjusters for Brakes; and I hereby declare the following to be a full, clear, and exact description of the same, reference being had to the accompanying drawings, in which—

Figure 1, is an elevation of the slack adjusting mechanism, the brake levers, and so much of a truck and wheels as is required to illustrate one application of the invention. Fig. 2, is a detached view, partly in section, of the mechanism embodying my invention. Fig. 3, is a transverse section of the mechanism taken on the line $x-x$ Fig. 1, and Fig. 4, is a partial plan or top view of the casing for the ratchet nut and pawl, also showing the end of the reciprocating or slide bar which actuates the pawl.

Like symbols refer to like parts wherever they occur.

My invention relates to the construction of that class of devices termed "slack-adjusters" employed in conjunction with brake mechanism to automatically take up the slack arising from the wear of the brake shoes and from other causes; and to adjust and maintain the proper relation of wheels and shoes when the brakes are off—so that a given and predetermined movement of the power mechanism shall at all times effectually apply the brakes.

The object of my invention is to provide simple and efficient mechanism for the purpose, which can be readily applied by the skilled mechanic at any point in the brake mechanism where an excess of angular movement occurs by reason of the wear on the brake shoes, and though for purposes of illustration I have shown the mechanism as applied to the lower or bottom rod of the truck and the excessive angular movement which actuates the nut as taken from the "live" lever, I do not intend to be limited to such application of the devices.

The invention, generally stated, consists in the combination with a threaded connecting rod and a rotating ratchet nut, of a pawl, and a slide having a cam mechanism for actuating the pawl, whereby any excessive movement of the brake lever system causes the rotation of the nut and readjustment of the connections to compensate for wear or take up the slack.

There are other minor features of invention, all as will hereinafter more fully appear.

I will now proceed to describe my invention more fully so that others skilled in the art to which it appertains may apply the same.

In the drawings, A indicates that portion of the truck from which the brake beams B, B are suspended by the usual hangers $b\ b$.

H, H indicate the brake heads provided with the usual shoes.

D indicates the "dead"-lever, L the "live"-lever, P the pull rod or power rod, and C the lower connecting rod or bottom rod of a brake system. One end of said connecting rod C is pivotally attached to the lower end of the "dead"-lever D as at $c$, and the opposite end is threaded and projects into a casing 2, which is pivotally connected as at $l$ to the lower end of the "live" lever L. On the threaded end 1 of the connecting rod C, and inclosed within the casing 2, is a rotating nut 3 having ratchet teeth $3^a$ upon its periphery with which engages a spring pawl 4 vertically movable in a pawl-case 5. The casing 2, is provided with a projecting pawl-box or chamber $2^a$ which incloses the reciprocating spring pawl 4 and pawl-case 5, and the sides of said box $2^a$ are slotted as at 6 for the passage of one end of a slide bar or arm 7, which is pivoted to "live" lever L as at $7^a$, and moved at substantially right angles to the line of motion of the dog or pawl 4. The end of slide bar 7 which passes through the slotted pawl-box $2^a$ has a circular aperture in which is adjustably secured a circular disk 8 by means of a set screw 9, and said disk 8 is provided with an elongated slot $8^a$ through which passes the pawl-case 5. It will be noted that when the disk 8 is adjusted and secured with its slot at an angle to the line of motion of the slide a slide cam mechanism for actuating the pawl is obtained.

The mechanism being of substantially the construction hereinbefore specified will operate as follows: The brake mechanism having been adjusted in the usual manner so that the shoes will maintain the desired distance from, or relation to, the wheels when the brakes are off, the lever system will move only through the predetermined distance—or have only a "normal" movement—so long as the shoes remain unworn or slightly worn or from other cause no slack occurs in the system, but as soon as the shoes become worn or slack occurs—the levers of the system (in the present instance the "live"-lever L) will have an excessive angular movement required to bring the shoe to its bearing on the wheel. This excessive angular movement of the lever causes the slide bar 7 to advance through the slotted pawl-box $2^a$, and the sides of the elongated slot $8^a$ of disk 8 acting on the pawl-case 5 and the contained spring pawl 4 will shift the pawl or cause it to advance on the ratchet face $3^a$ of the nut 3 so that on the return movement of slide bar 7 (due to the return movement of the lever when the brakes are released) the nut will be rotated on the threaded end 1 of rod C, and the compensation for slack or wear effected. The greater or less movement of the spring pawl 4 (and consequent rotation of nut 3) will depend on the position of adjustable disk 8, or the angle which the elongated slot bears to the line of motion of the slide bar 7.

For purposes of illustration I have seen fit to show my improved slack adjuster mechanism in connection with outside hung truck brakes, but it will be evident to the skilled mechanic that by simply reversing the operative ratchet mechanism so as to force out the threaded rod instead of drawing it in by the rotation of the nut 3 the devices will apply equally well to inside hung brakes; and it will also be equally evident to the skilled mechanic that the mechanism herein described may be readily adapted for use at various points in the brake system, as for instance on the fulcrum bar between the levers of separate trucks. I do not therefore confine my invention to use in the special position or relation chosen for purposes of illustration, but—

Having thus described my invention what I claim and desire to secure by Letters Patent is:—

1. In a slack adjuster for brakes, the combination with a threaded connecting rod, and a ratchet nut arranged thereon, of a pawl, and a cam slide mechanism for actuating the pawl; substantially as and for the purposes specified.

2. In a slack adjuster for brakes, the combination with a threaded connecting rod, and ratchet nut arranged thereon, of a reciprocating pawl, and a reciprocating slide having a slot inclined to its line of motion adapted to receive the reciprocating pawl, said slide arranged to move in a line substantially at right angles to the line of motion of the pawl; substantially as and for the purposes specified.

3. In a slack-adjuster for brakes, the combination with a threaded connecting rod and ratchet nut arranged thereon, of a pawl, and a reciprocating bar provided with an adjustable slotted disk which receives the pawl; substantially as and for the purposes specified.

4. In a slack-adjuster for brakes, the combination with a threaded connecting rod, and a ratchet nut arranged thereon, of a spring pawl, a pawl-case which incloses the pawl, a reciprocating bar, and an adjustable slotted disk arranged in the bar and which incloses the pawl-case; substantially as and for the purposes specified.

In testimony whereof I affix my signature, in presence of two witnesses, this 5th day of November, 1892.

WILLIAM W. HOLMES.

Witnesses:
GEORGE A. POWELL,
JOHN H. MILLS.